United States Patent [19]

Bobo

[11] Patent Number: 5,018,873
[45] Date of Patent: May 28, 1991

[54] AIR TEMPERATURE MEASUREMENT
[75] Inventor: Melvin Bobo, Cincinnati, Ohio
[73] Assignee: General Electric Company, Cincinnati, Ohio
[21] Appl. No.: 725,964
[22] Filed: Apr. 22, 1985
[51] Int. Cl.$^5$ .................. G01K 13/02; F02B 39/04
[52] U.S. Cl. .................. 374/144; 244/53 B; 374/135
[58] Field of Search .................. 374/144, 135; 73/198; 60/39.07; 244/53 B, 53 R

[56]  References Cited
U.S. PATENT DOCUMENTS

| | | | |
|---|---|---|---|
| 2,606,420 | 8/1952 | Moore, Jr. | 374/144 X |
| 3,067,577 | 12/1962 | Dew | 374/144 |
| 3,167,960 | 2/1965 | Miesiak | 374/144 X |
| 3,446,223 | 5/1969 | Hancock | 244/53 X |
| 3,515,002 | 6/1970 | Palmer | 374/135 X |
| 3,552,883 | 1/1971 | Weatherbee | 417/76 |
| 3,618,876 | 11/1971 | Skidmore | 244/53 B |
| 4,047,379 | 9/1977 | Brookes et al. | 60/39.09 D |
| 4,182,119 | 1/1980 | Hurley | 60/226 R |
| 4,215,565 | 8/1980 | Zanker | 73/30 |
| 4,459,802 | 7/1984 | Mowill | 60/39.07 |

Primary Examiner—Daniel M. Yasich
Attorney, Agent, or Firm—Jerome C. Squillaro

[57]  ABSTRACT

In one form of the invention, different airflows across a temperature sensor in an aircraft are maintained during different flight conditions. A first airflow is generated during takeoff by a pressure differential existing between two surfaces of the aircraft. A second airflow is maintained during cruise by an air jet supplied by an ejector.

10 Claims, 1 Drawing Sheet

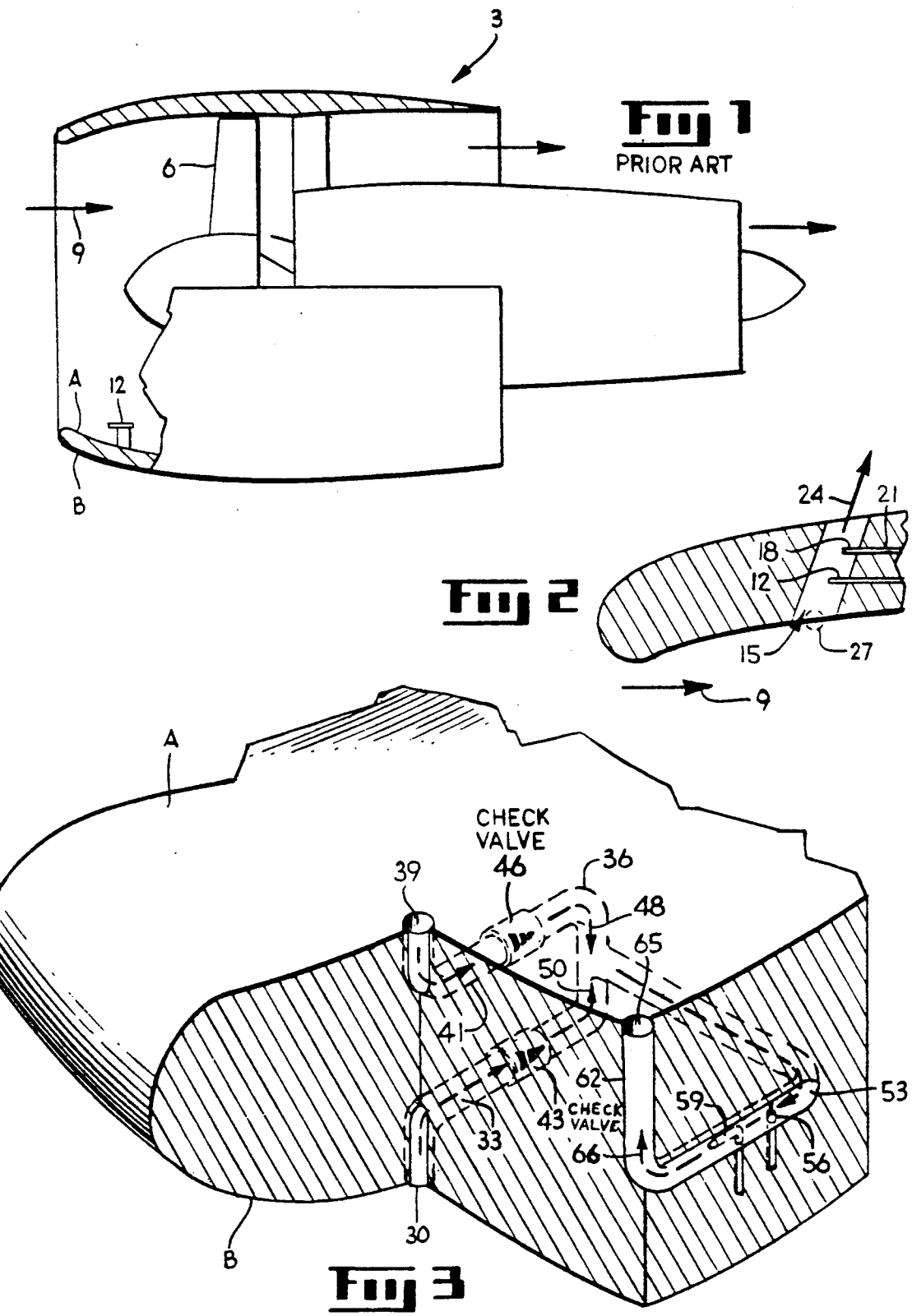

AIR TEMPERATURE MEASUREMENT

The present invention relates to the measurement of the temperature of inlet air received by an aircraft engine.

BACKGROUND OF THE INVENTION

FIG. 1 illustrates in cross section a nacelle 3 on an aircraft (not shown) which contains a gas turbine engine (not shown) which powers a fan 6. the temperature of the inlet airstream 9 must be measured in order to control the operation of the engine. However, a temperature sensor positioned as shown by sensor 12 may become damaged by incoming debris, such as dirt, hail, snow, and birds. Further, a sensor such as sensor 12 will be affected by the anti-icing apparatus which heats the nacelle 3: the sensor 12 will not register the actual temperature of the incoming airstream.

One approach to preotecting the sensor 12 locates it within a protective duct 15 in FIG. 2. However, the temperature of the duct 15 itself will affect the temperature of the air flowing through it, with the result that sensor 12 located within the duct 15 will have a time lag in response to changes in temperature of the air passing through the duct. Such a time lag is not desirable.

The ejector 18 is connected by a duct 21 to a source of high pressure air, such as compressor air bled from the engine (not shown). The ejector ejects an airstream 24 into the duct which draws upstream air in region 27 across the temperature sensor. The ejector 18 also functions to reduce the effect of the duct temperature on the airstream striking the sensor. One problem which results from the use of ejectors is that the inlet air velocity is greater at cruise than at takeoff. If the ejector 18 is designed to draw the proper amount of air across the sensor 12 during takeoff, then at the higher speed cruise conditions, an unnecessarily large amount of air is ejected as airstream 24, thus wasting energy.

OBJECTS OF THE INVENTION

It is an object of the present invention to provide a new and improved apparatus for air temperature measurement in aircraft.

It is a further object of the present invention to provide a new and improved apparatus for accurate temperature measurement in aircraft nacelles at both high and low speeds.

SUMMARY OF THE INVENTION

In one form of the invention, different airflows across a temperature sensor in an aircraft are maintained during different flight conditions. A first airflow is generated during takeoff by a pressure differential existing between two surfaces of the aircraft. A second airflow is maintained during cruise by an air jet supplied by an ejector.

BRIEF DESCRIPTION OF THE DRAWINGS

FIG. 1 depicts a temperature sensor 12 in a nacelle which houses a gas turbine engine.

FIG. 2 depicts a duct 15 which can be used to channel air onto a temperature sensor 12.

FIG. 3 deicts one form of the present invention.

DETAILED DESCRIPTION OF THE INVENTION

One form of the present invention is shown in FIG. 3. In that Figure, surfaces A and B correspond to surfaces A and B in FIG. 1. A first port 30, in surface B, is connected by a pipe 33 to a T-junction 36. A second port 39, in surface A, is connected by a pipe 41 to the T-junction 36. Check valves 43 and 46 contained in pipes 33 and 41 allow flow to occur only in the direction shown by arrows 48 and 50. Such check valves are known in the art.

The T-connection 36 is connected to sampling pipe 53 in which the air temperature is sampled by a temperature sensor 56 contained therein. An ejector 59 is positioned in the sampling pipe 53 downstream of the temperature sensor. The sampling pipe leads to an exhaust pipe 62 which provides a flowpath from the T-connection 36 to a third port 65 contained in surface A and located near the second port 39.

An ejector 59 generally similar in principle to ejector 18 in FIG. 2 injects an airstream, or pressure jet 66 into the exhaust pipe 62 in order to draw air from either the first and second ports across the temperature sensor 56.

The operation of the present invention is as follows. During takeoff, the pressure on surface B (termed "$P_B$") is greater than the pressure on surface A ($P_A$). Accordingly, a first flowpath is established between the first port 30 and the third port 65 because check valve 43 is open and check valve 46 is closed. Air enters the first port 30, crosses the temperature sensor 56, and exits the third port 65.

As the aircraft approaches cruise conditions, PA increases relative to PB for a variety of reasons which include the change of the attitude of the nacelle 3 with respect to the incoming airstream 9 as well as the increase in Mach number compared with the Mach number at takeoff. When PA exceeds PB, check valve 43 closes. Ordinarily, check valve 46 would be in an indeterminate position, because PA is applied both to the second port 39 and the third port 65. However, the ejector 59 lowers the pressure in the exhaust pipe 62 with respect to PA, thus opening the second check valve 46. The opening of the second check valve 46 provides a second flowpath originating at the second port 39 on the inner surface A of the nacelle 3, past the temperature sensor 56, and out the third port 65, also located on the second surface A.

It is noted that the ejector 59 is designed such that airflow past the sensor 56 is proper at cruise, and not at takeoff, for at cruise it is primarily the ejector which maintains flow past the temperature sensor 56. In contrast, during takeoff, it is the pressue differential existing between the first port 30 and the third port 65 which maintains flow. Therefore, an ejector can be used which is sized properly for cruise conditions rather than for takeoff conditions.

In addition, the temperature transients which occur during cruise are not so great as those occurring during takeoff. Thus, the flushing action needed to prevent the temperature of the walls of pipes such as pipe 41 from greatly influencing the temperature of the air reaching the sensor 56 need not be so great as the flushing action needed at takeoff. This lesser flushing action is provided by the ejector 59, as stated above. Restated, the greater flushing needed during takeoff is obtained by the difference between PA and PB, while the lesser flushing needed during cruise is provided chiefly by the ejector 59. Further, this difference in flushing airflows is obtained without the throttling of the ejector 59 or any similar active intervention by the pilot or automatic equipment.

Numerous substitutions and modifications can be undertaken without departing from the true spirit and scope of the present invention.

What is desired to be secured by Letters Patent is the invention as defined in the following claims.

I claim:

1. In an aircraft engine nacelle, the improvement comprising:
   (a) a temperature sensor;
   (b) means for maintaining a first airlow across the temperature sensor during takeoff; and
   (c) means for maintaining a second airflow across the temperature sensor during cruise which is less than the first airflow.

2. The apparatus of claim 1, in which the temperature sensor is located inside the nacelle between the inner and outer surfaces of the nacelle.

3. The apparatus of claim 2, in which the means for maintaining a first airflow and the means for maintaining the second airflow comprise ejector means.

4. In an aircraft engine nacelle having an inner surface and an outer surface, a temperature sensing apparatus:
   (a) a first port in the outer surface which leads to a junciton;
   (b) a second port in the inner surface which leads to the junction of (a);
   (c) check valve means for preventing flow in a direction from the junction to the first port and from the junction to the secone port;
   (d) a sampling pipe connected to the junction and containing a temperature sensor;
   (e) an exhaust pipe connecting the sampling pipe to a third port located on the inner surface and in a region at substantially the same pressure as the second port; and
   (f) means for supplying a pressure jet into the exhaust pipe for drawing air through the second port and across the temperature sensor when the pressure on the inner surface approximately exceeds the pressure on the outer surface.

5. the apparatus of claim 1, in which the means for maintaining a first airflow and the means for maintaining a second airflow comprise ejector means.

6. the apparatus of claim 1, in which the means for maintaining a first airflow comprises an ejector means for drawing air from the outer surface of the nacelle across the temperature sensor during takeoff; and
   the means for maintaining a second airflow comprises an ejector means for drawing air from the inner surface of the nacelle across the temperature sensor during cruise.

7. In an aircraft engine nacelle having an inner surface and an outer surface, the improvement comprising:
   (a) a temperature sensor contained within a sampling duct;
   (b) means for drawing an airflow from the outer surface and through the sampling duct during takeoff; and
   (c) means for drawing an airflow from the inner surface and through the sampling duct during cruise.

8. The improvement according to claim 7 and further comprising:
   (d) means for preventing the air flow from the inner surface during takeoff; and
   (e) means for preventing the air flow from the outer surface during cruise.

9. the apparatus of claim 7, in which the means for drawing an airflow from the outer surface of the nacelle and the means for drawing an airflow from the inner surface of the nacelle comprise an ejector means.

10. the apparatus of claim 2, in which the means for maintaining a first airflow comprises an ejector means for drawing air from the outer surface of the nacelle across the temperature sensor during takeoff; and
   the means for maintaining a second airflow comprises an ejector means for drawing air from the inner surface of the nacelle across the temperature sensor during cruise.

* * * * *